Sept. 26, 1967            H. LUDWIG            3,343,223

APPARATUS FOR MAKING SHOES BY INJECTION MOLDING OF AN ELASTOMER

Filed Sept. 24, 1965            4 Sheets-Sheet 1

INVENTOR.
Herbert Ludwig
BY
Roberts, Cushman & Grover
ATT'YS

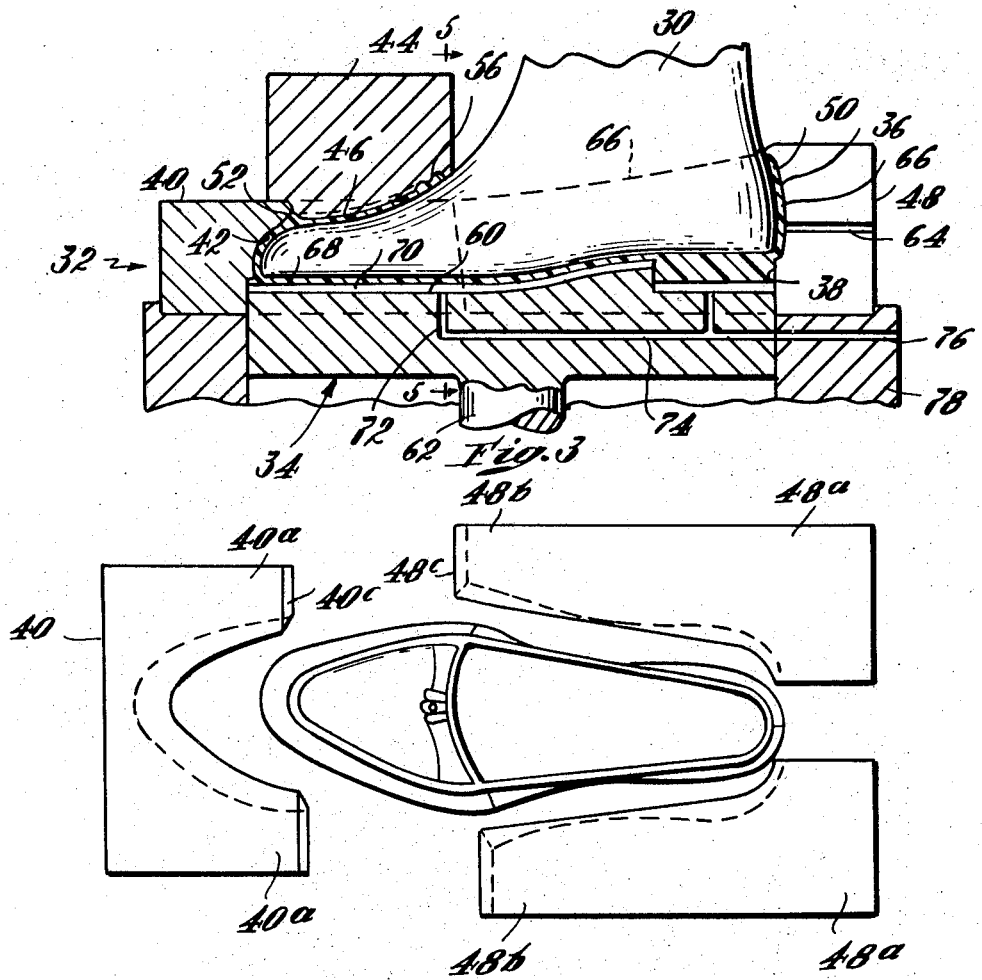
Fig. 3
Fig. 4
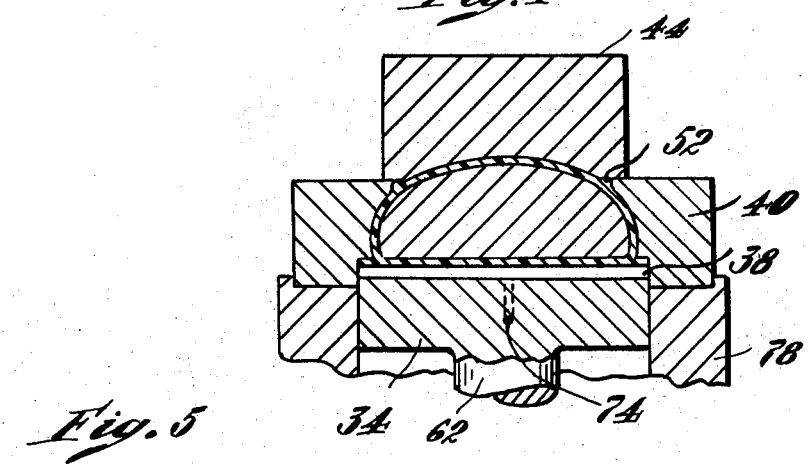
Fig. 5

Sept. 26, 1967                H. LUDWIG                3,343,223
APPARATUS FOR MAKING SHOES BY INJECTION MOLDING OF AN ELASTOMER
Filed Sept. 24, 1965                                4 Sheets-Sheet 4
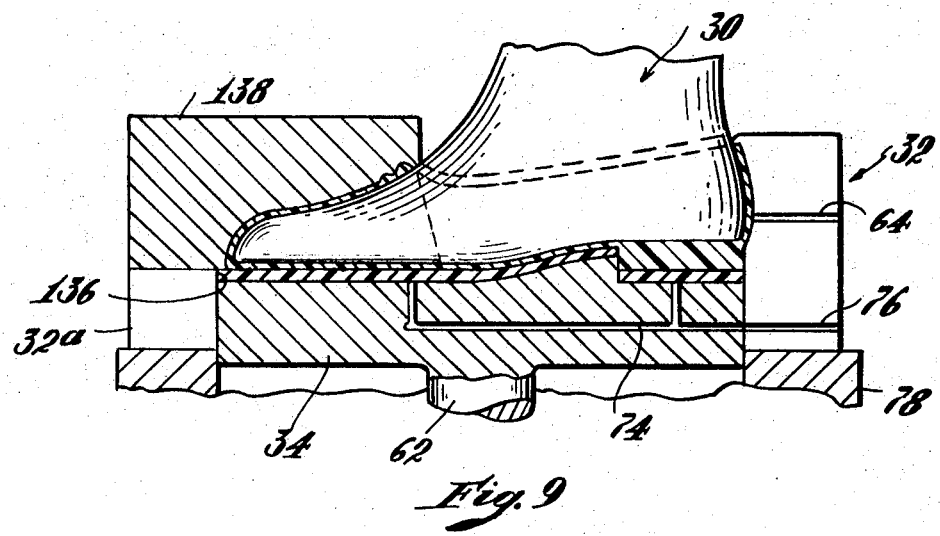
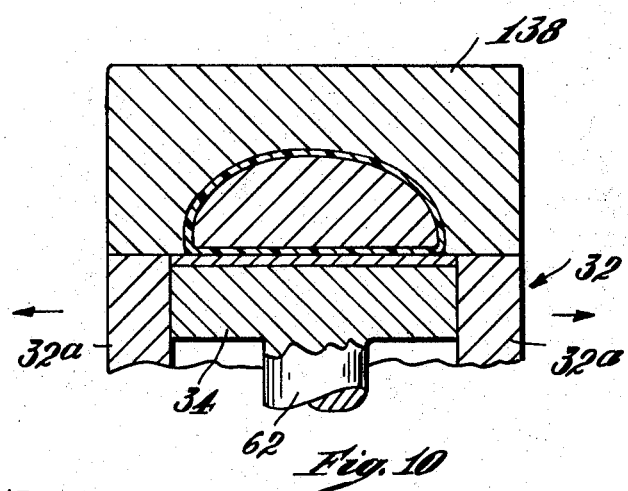
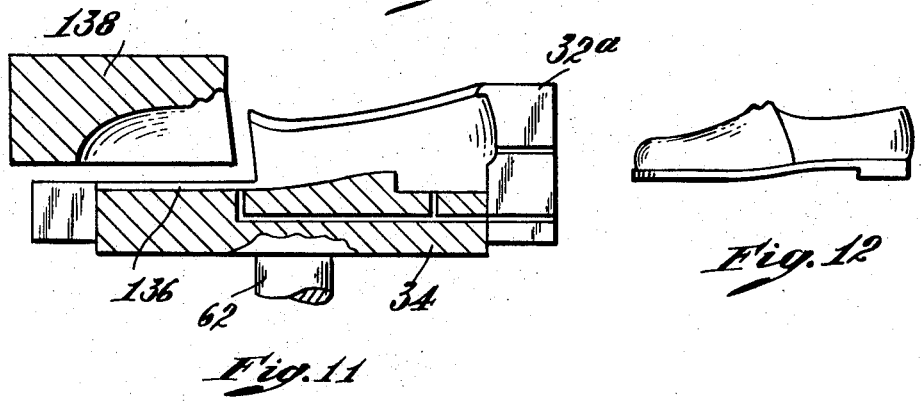

United States Patent Office 3,343,223
Patented Sept. 26, 1967

3,343,223
APPARATUS FOR MAKING SHOES BY INJECTION MOLDING OF AN ELASTOMER
Herbert Ludwig, Desmastr. 112, Usen, near Bremen, Germany
Filed Sept. 24, 1965, Ser. No. 489,816
14 Claims. (Cl. 18—42)

This invention relates to the manufacture of footwear by injection molding of the entire upper and bottom of an elastomeric material and has for its principal objects to provide apparatus designed to lessen the artificial appearance so objectionable in this kind of footwear; to make possible employment of different kinds of elastomer for the upper and bottom; to provide for greater flexibility in the upper and greater wear in the bottom or for different color combinations; and to simulate in appearance the conventional leather or fabric upper wherein the component parts of the upper, to wit, the vamp and/or toe piece and quarters are joined by one or more seams which enhance the appearance of the shoe and which may have embossing simulating appliques and piping around the foot opening.

As herein illustrated, the foregoing is achieved by providing a mold assembly comprising a last, a side ring including an insert and a sole plate; characterized in that the mold ring is comprised of a plurality of parts which collectively provide an upper-forming cavity, the interior surface of which corresponds to the exterior surface of the last, and a bottom-forming cavity corresponding in size to the bottom to be formed, and that the sole plate has a surface complementary to the tread surface of the bottom designed to be moved toward and away from the bottom of the last to enable making a first injection with the sole plate raised to form the upper and an inner sole layer, and with the sole plate lowered to enable making a second injection to form an outsole layer. The side ring in one form comprises a first part containing a cavity below the bottom of the last corresponding in size to the bottom to be formed and rearwardly of the widest part of the last a second part above the bottom of the last having an interior surface which, in conjunction with the side wall of the last above the bottom, provides an upper-forming cavity coextensive with the back part of the shoe. In this form the insert embodies an interior surface above the bottom of the last coextensive with the forepart of the shoe and extending down to the bottom which forms, in conjunction with the side wall of the last, an upper-forming cavity at the forepart corresponding to the vamp portion of the shoe. The first and second parts are divided longitudinally from the tip of the toe to the heel end and are separable laterally. The insert is movable upwardly away from the first part. Alternatively, the side ring comprises a forepart, a forepart insert and a two-part back part. The forepart contains an interior surface above the bottom of the last which, in conjunction with the side wall of the last, provides an upper cavity coextensive with the side wall of the vamp portion of the shoe and an interior surface below the bottom of the last which, in conjunction with the bottom of the last and the top of the sole plate, provides a bottom-forming cavity at the forepart of the assembly. The insert has an interior surface which, in conjunction with the top wall of the last, forms a cavity coextensive with the top of the vamp. The back part has interior surfaces above the bottom of the last which, in conjunction with the side wall of the last, provides an upper-forming cavity at the back part coextensive with the quarter portions of the shoe and interior surfaces below the bottom of the last corresponding in size to the bottom which, in conjunction with the bottom of the last and the upper surface of the sole plate, form a bottom-forming cavity at the back part of the assembly. The rear extremities of the forepart which correspond to the vamp meet the forward extremities of the back part which correspond to the quarters so that the junction of the parts occur where it is customary to stitch the parts to each other. The surfaces of the parts at the places of junction may be recessed to simulate a seam and the stitching conventionally employed to make seams. If a blucher type of shoe is to be made wherein the quarters are extended toward each other across the instep to hold eyelet ferrules for lacing, the back part is provided at its opposite sides with extensions and the forepart insert is provided with a part extending rearwardly between the back part extensions. There are clearances between the part back extensions and the rearwardly extending portion of the insert which provide cavities corresponding in size and thickness to the extensions of the quarters. The rearwardly extending part of the insert contains at its lower surface a recess providing a cavity between it and the last, corresponding in size and thickness to the tongue. The several parts of the composite ring are separable, the forepart forwardly, the insert upwardly and the two parts of the back part laterally away from each other.

The invention will now be described in greater detail with reference to the accompanying drawings wherein:

FIG. 3 is a longitudinal section of the mold assembly, to larger scale, showing the upper and insole formed by the first injection and the sole plate lowered preparatory to the second injection;

FIG. 4 is a plan view of FIG. 3 with the component parts of the mold assembly separated to permit removing the finished shoe and with the forepart insert omitted;

FIG. 5 is a transverse section taken on the line 5—5 of FIG. 3;

FIG. 9 is a section longitudinally of a mold assembly modified to form a vamp without a seam;

FIG. 10 is a transverse section of the mold assembly shown in FIG. 9;

FIG. 11 is a section of the mold assembly of FIGS. 9 and 10, showing the forepart insert separated from the ring; and FIG. 12 is an elevation of a shoe having a plain seamless vamp.

Figure 2:
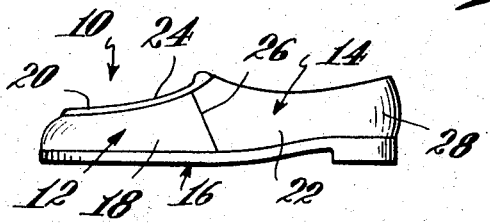
FIG. 2 is an elevation of a shoe made according to the invention with the assembly shown in FIG. 1.

Referring to the drawings, the invention is concerned with manufacturing shoes in which the upper and bottom are comprised of an elastomer formed on a last within a mold by injection molding, and in accordance with this invention to make a shoe 10, such as shown in FIG. 2, simulating in appearance a conventionally manufactured shoe having a forepart 12, back part 14 and bottom 16. In the illustrated shoe of FIG. 2, the forepart 12 is comprised of a vamp having a side wall 18 and a top 20 joined by a seam 24, the back part comprises quarters 22—22 which may be continuous all the way around the heel end or may be joined at the heel end by a back seam 28. The rear extremities of the vamp are joined to the forward extremities of the quarters by seams 26—26.

To enable making a shoe of the foregoing kind by injection molding a mold assembly such as shown in FIGS. 3, 4 and 5 is employed comprising a last 30, a side mold ring 32 and a sole plate 34. The ring 32 has an interior which is adapted to receive the last 30 with a clearance and provides, in conjunction with the side surface of the last, an upper-forming cavity 36 and below the last a bottom-forming cavity 38 corresponding in size to the bottom which is to be formed and of a depth greater than the thickness of the bottom into which the sole plate 34 is adapted to be snugly fitted and to be movable therein relative to the bottom of the last.

In one form the ring 32 embodies a forepart 40 (FIGS. 3, 4 and 5) having an interior surface 42 coextensive with the side wall of the vamp portion of a shoe, a forepart insert 44 having an interior surface 46 coextensive with the top of the vamp portion of the shoe and a back part 48 having an interior surface 50 coextensive with the quarter portions of the shoe. The forepart 40 is comprised of one piece and extends from the tip of the toe rearwardly along the sides to the widest part of the last as shown in FIG. 4, the insert is comprised of one piece and extends from the tip of the toe rearwardly to the foot opening (FIG. 3), and the back part 48 is made of two pieces 48a—48a which meet along the median of the last and extend from the back seam forwardly to the widest part of the last (FIG. 4). The rear extremities 40a—40a of the forepart 40 and the forward extremities 48b—48b of the back part meet at the widest part of the last and respectively have sloping portions 40c—40c and 48c—48c interengageable to provide a seal at the place of junction. In order to simulate the seam 24 joining the side wall 18 of the vamp and the top 20 of the vamp, the inner surfaces 42 and 46 of the ring and insert are grooved collectively to form an upwardly convex groove 52 (FIG. 3) corresponding in cross-section to the seam 24 which is to be formed during injection. Similarly, at the junction of the rear extremities of the forepart 40 and the forward extremities of the back part 48, grooves 54—54 (FIG. 1) are formed to simulate the seams 26—26. Optionally, a groove 56 may be provided in the interior surface 46 of the insert 44 to provide a decorative finish at the rear extremity of the top opening as illustrated in FIG. 3. A decorative edge of this kind may be extended around the open top of the shoe if desired by providing a similar kind of groove in the interior surface 50 of the back part 48.

The sole plate 34 has an upper surface 60 complementary in shape to the tread surface of the bottom which is to be formed and is supported on a ram 62 for movement within the cavity 38 at the lower side of the ring relative to the bottom of the last.

The ring contains an injection passage 64 through which an elastomer may be injected into the cavity 36 between the last and the ring and into the cavity 38 between the bottom of the last and the sole plate with the latter raised to form an upper 66 comprised of the parts 18, 20 and 22 and a bottom layer 68 comprising an inner sole and a part of a heel integral with the upper. The sole plate 34 is also provided with injection passages 72—72 which enter the mold cavity 38 through the upper surface and a passage 74 which connects the passages 72—72 with an injection passage 76 formed in the support 78 of the mold assembly. The passages 74 and 76 are displaced relative to each other while the sole plate is raised to effect injection of the upper and inner sole and are in alignment with each other when the sole plate is lowered for injecting an outer layer 70 comprising the outsole and heel cap.

As has been previously described in the pending application Ser. No. 433,146, filed Feb. 16, 1965, the entrance ends of the injection passages 72—72 may be covered while the first injection is taking place to prevent the elastomer from entering these openings and of interfering with the free flow of the elastomer through these openings during the formation of the outer sole.

Figure 1:
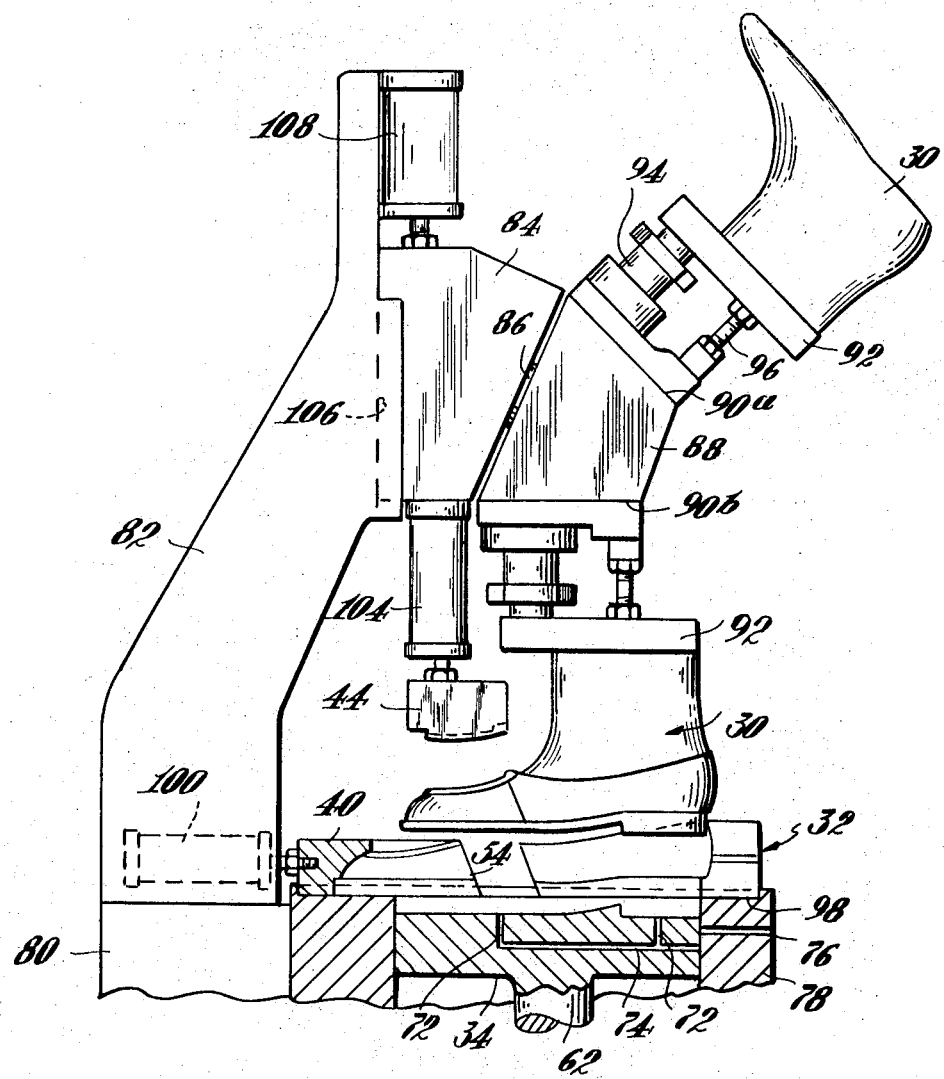
FIG. 1 is an elevation, partly in section, of an apparatus embodying one form of the novel mold assembly of the present invention.

FIG. 1 illustrates a conventional piece of apparatus for supporting a pair of lasts 30—30 for alternate engagement with a mold assembly 32 mounted on a support 78 extending horizontally from a supporting frame 80, the lower part of which is not herein illustrated. The frame 80 has an upwardly and forwardly inclined post 82 on which is mounted a bearing block 84 which rotatably supports a shaft 86. The shaft 86 is inclined downwardly and forwardly and has fixed to its protruding end a block 88. The block 88 has converging faces 90a and 90b so inclined relative to the axis of the shaft 86 that when the block is rotated the face at the underside will be parallel to the subjacent mold assembly. The lasts 30 are fastened to the surfaces 90a and 90b in such fashion that rotation of the block about the axis of the shaft will bring the bottom of the last, which is rotated to the lower position, into a substantially horizontal position above the mold assembly and when rotated to the upper position will support the last in a forwardly disposed position to enable easily stripping the finished shoe from the last. Each last is bolted to a plate 92 and the latter is adjustably fastened by means of a ball and socket connection 94 and screw 96 to the block 88 to enable initially adjusting the last to insure proper seating of the bottom against the open top of the mold.

The ring 32 is mounted on the upper surface 88 of the support 78 with its several parts recessed into the support so that they may be separated from each other after the shoe is formed to enable removing the last with the finished shoe on it and after the shoe is removed to position the opposite last with an upper assembled thereon in position for injection. Power-operated means is preferably employed to move the component parts, although manual means could be used for this purpose. In FIG. 1 a cylinder and piston assembly 100 is mounted on the post 82 to move the forepart 40 horizontally toward and away from the back part 48. Similar piston and cylinder assemblies (not shown) are employed for moving the back parts 48a—48a transversely relative to each other. The forepart insert 44 is moved to and from the top of the last by a piston and cylinder assembly 104 which is supported at the lower side of the block 84. The block 84 is movable height-wise on the post in a guideway 106 to raise and lower the last relative to the mold assembly. A piston and cylinder assembly 108 mounted on the post 82 above the block 84 is provided for this purpose.

It is of course within the scope of the invention to employ any suitable control system for supplying hydraulic fluid to the piston and cylinder assemblies either to operate them independently of each other or in sequence in such fashion as to automate the operation of the machine once its operation has been initiated by actuation of a suitable starting valve.

Figure 6:
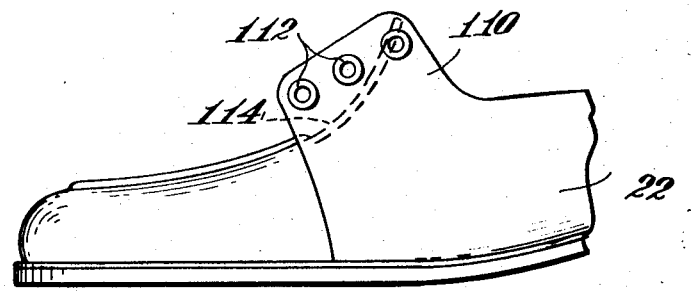
FIG. 6 is a fragmentary elevation of a blucher-type shoe which may be formed by injection with minor modifications in the mold assembly.
Figure 7:
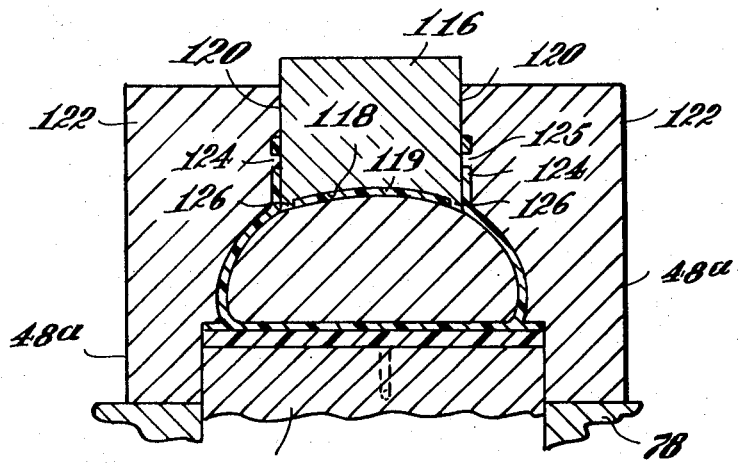
FIG. 7 is a transverse section of the mold assembly modified to form the blucher-type shoe shown in FIG. 6.
Figure 8:
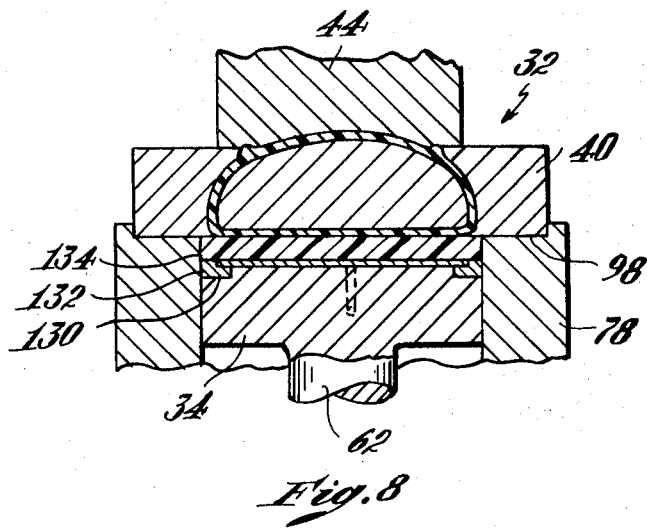
FIG. 8 is a transverse section of a mold assembly wherein the sole plate meets the bottom of the ring but does not fit into it and the upper surface of the sole plate is provided with a sealing gasket.

As illustrated, the shoe designed to be made by the mold assembly described above was of the open or loafer type wherein the vamp comprised a side wall and a top or plug. It is within the scope of the invention however to make a shoe of the kind commonly known as a "blucher" embodying a tongue and eyelets as illustrated in FIG. 6. The shoe has extensions 110—110 at the forward extremities of its quarters 22—22 in which there are eyelets 112—112 and a tongue 114 extending rearwardly from the top of the vamp between the extensions 110—110. FIGS. 7 and 8 illustrate a modification of the mold assembly designed to form the extensions 110—110 with the eyelet holes 112—112 and the tongue 114 during the injection of the upper part of the shoe. For this purpose a part 116 is supported above the last which may be a rearwardly extending portion of the insert 44 and which is provided with a lower or interior surface 118 which affords a clearance space or cavity 119 above the top of the last corresponding in width and thickness to the tongue which is to be formed. The opposite side surfaces 120—120 of the part 116 are slidably received between extensions 122—122 of the back parts 48a—48a and contain at their inner sides recesses 124—124 which provide cavities 125—125 corresponding in area and thickness to the thickness of the extensions 110—110. The lateral edges of the part 116 have downwardly projecting ribs 126—126 which bear against the surface of the last thus precluding the entrance of the elastomer in these narrow areas so that the tongue is connected only to the vamp. To form the eyelet holes 112 the extensions 122—122 have on their inner surfaces 124—124 projections 128 which extend from the surfaces 124—124 into engagement with the surfaces 120—120.

A shoe of the foregoing kind is made in the same fashion as described above by double injection wherein an upper and an insole is first formed and then an outsole formed.

A modification of the mold assemblies is shown in FIG. 8 where the sole plate 34 does not enter the lower side of the ring 32 but is brought into contact with the lower face of the ring and extends beyond the peripheral edge by an amount corresponding to the peripheral extension of the bottom to be formed. To enable forming a shoe with this structure without formation of flash it is necessary to provide a seal between the upper surface of the sole plate and the lower surface of the ring during the first injection. This is accomplished by providing a peripheral groove 130 in the upper face of the sole plate, mounting a resilient gasket 132 of L-shaped cross-section in the groove and securing the gasket in place with a plate 134 fastened to the top of the sole plate by suitable means. During the first injection with the sole plate raised to the level of the lower side of the ring, the resilient gasket 132 will seal the area of contact between the upper surface of the sole plate and the lower surface of the ring so as to prevent any of the elastomer from flowing outwardly as it fills the space between the side of the last and the ring and between the bottom of the last and the sole plate. When the sole plate is now lowered to form the outsole, the elastomer will flow outwardly beyond the bottom of the last to form the bottom extension. The plate 134 corresponds substantially in size to the bottom opening of the ring.

FIGS. 9 and 10 illustrate still another modification of the mold assembly for making a shoe such as shown in FIG. 12 with a one-piece vamp in which the ring 30, from the tip end of the last rearwardly to the widest part thereof, embodies only a cavity 136 which is complementary to the edge face of the bottom to be formed. The remainder of the ring, that is, the part rearwardly of the widest part of the last, as previously described, has a cavity corresponding to the quarters of the upper and the edge face of the bottom rearwardly of the widest part of the last. In this modified form the forepart and rear part of the ring are one-piece from toe to heel and the ring is split medially so that the two halves may be separated from each other. The insert 138 is one-piece and provides a cavity coextensive with the entire side and top surfaces of the vamp so that the latter is seamless. FIG. 11 shows the insert 138 elevated from one-half of the ring. The insert 138 is movable vertically and the ring halves 32a—32a are separable laterally from each other.

It is possible by means of the double injection provided as described above to form a shoe with an upper comprised of a soft material and a bottom of a stiffener and more wear-resistant material and also to provide for different color combinations for the top and bottom.

It should be understood that the present disclosure is for the purpose of illustration only and that this invention includes all modifications and equivalents which fall within the scope of the appended claims.

I claim:

1. A mold assembly for injection molding of footwear, said assembly embodying a last, a side ring and a sole plate, characterized in that the side ring is comprised of a plurality of parts which collectively provide an upper-forming cavity, the interior surface of which is complementary to the exterior surface of the last with a clearance therebetween corresponding in thickness to the upper to be formed, and a bottom-forming cavity corresponding in size to the bottom to be formed and of greater depth than the thickness of the bottom, and a sole plate embodying a surface complementary to the thread surface of the bottom adapted to be moved relative to the bottom of the ring.

2. A mold assembly according to claim 1, wherein the ring comprises a forepart piece separable from the remainder of the ring, said forepart piece extending from the tip of the toe to the widest part of the last and having an interior surface coextensive with the vamp portion of the shoe.

3. A mold assembly according to claim 1, wherein the ring comprises a forepart having an interior surface coextensive with the side wall of the vamp and a forepart insert having an interior surface coextensive with the top of the vamp, said forepart and forepart insert extending from the tip of the toe rearwardly to the widest part of the last, and a rear part which extends from the rear extremnity of the forepart to the back line of the heel end of the last, said rear part having an interior surface coextensive with the quarter portion of the shoe.

4. A mold assembly for injection molding of footwear, said assembly embodying a last, a side ring and a sole plate, characterized in that the side ring comprises a forepart and a back part, the latter being divided medially and the parts meeting respectively at the widest part of the last and at the heel end along lines of junction corresponding to the seam conventionally joining the vamp and quarters and the seam at the back line, said parts having interior surfaces which collectively form in conjunction with the side surface of the last an upper-forming cavity and below the bottom of the last a bottom-forming cavity corresponding in size to the bottom to be attached and of a greater depth than the thickness of the bottom, and the sole plate embodies the contour of the tread surface and is designed to fit snugly into the lower side of the composite ring and to be movable therein relative to the bottom of the last.

5. A mold assembly for molding footwear, said assembly embodying a last, a side ring and a sole plate, said side ring being characterized in that it comprises a forepart and a two-piece back part divided medially which meet respectively at the widest part of the last and at the heel end along lines of junction corresponding to the seams conventionally joining the vamp and quarters and the seam at the back line, said parts having interior surfaces which collectively form in conjunction with the side surface of the last an upper-forming cavity and below the bottom of the last a bottom-forming cavity corresponding in size to the bottom to be attached and of a greater depth than the thickness of the bottom, said interior of the ring also embodying means peripherally of the top opening to form a decorative top line around the top opening of the upper.

6. A mold assembly according to claim 4, wherein the forepart of the ring is separable from the rear part by movement forwardly relative to the rear part and the rear part is separable by movement of the parts transversely relative to each other.

7. A mold assembly for injection molding of footwear, said assembly embodying a last, a side ring and a sole plate, characterized in that the side ring comprises a two-piece forepart embodying a piece complementary to the side wall of the vamp and a piece complementary to the top of the vamp, said pieces having a line of junction corresponding to the line of the seam joining the vamp and plug, and a two-piece back part embodying pieces complementary to the quarters at each side of the back line, said pieces having a line of junction corresponding to the back seam, said parts having interior surfaces which collectively form in conjunction with the side wall of the last above the bottom an upper-forming cavity and below the bottom of the last a bottom-forming cavity corresponding in size to the bottom to be formed and of a greater depth than the thickness of the bottom, and the sole plate embodies the contour of the tread surface and is designed to fit snugly into said bottom-forming cavity.

8. A mold according to claim 7, wherein the part complementary to the side wall is movable forwardly and the part complementary to the top is movable upwardly.

9. A mold assembly for injection molding of footwear, said assembly embodying a last, a side ring and a sole plate movable relative to the ring, characterized in that the side ring has an interior surface which is coextensive with the side surface of the article of footwear to be formed including the edge face of the bottom but excluding the tread surface thereof, adapted to receive a last with a clearance between the side surface of the last and the interior surface of the ring corresponding to the thickness desired for the upper, and a cavity below the last of greater depth than the thickness of the bottom to be formed, said ring in conjunction with the side wall of the last forming a forepart cavity extending from the tip of the vamp to the junction of the vamp with the quarters, and a back part cavity extending from the back seam forwardly to the junction of the quarters with the vamp, said forepart and back part cavities being separable at their line of junction, and said sole plate being movable in the ring and forming in conjunction with the bottom of the last a bottom-forming cavity below the last, said sole plate being movable relative to the bottom of the last to permit a first injection with the sole plate raised to form the upper and an inner sole, and with the sole plate lowered to form an outer sole layer.

10. A mold assembly for molding of footwear, said assembly embodying a last, a side ring and a sole plate movable relative to the bottom side of the side ring, characterized in that the side ring comprises a forepart having an interior substantially coextensive with the vamp and the peripheral edge face at the bottom at the forepart, and a back part having an interior coextensive with the quarters and the peripheral edge face of the bottom at the back part, said forepart and back part meeting at the conventional location of the seam joining the rear ends of the vamp and the forward ends of the quarters and providing in conjunction with the side surface of the last an upper-forming mold cavity and below the bottom of the last a bottom-forming cavity, and said sole plate being movable in the bottom-forming cavity relative to the bottom of the last to enable selective injection of material first into the upper-forming cavity with the sole plate raised to form an upper and an insole layer integral therewith, and then through the sole plate with the latter lowered to form an outer sole layer.

11. A mold assembly for injection molding of footwear, said assembly embodying a last, a side ring and a sole plate, characterized in that the side ring embodies an interior opposite the side of the last coextensive with the interior surface of the upper to be formed which forms in conjunction with the side surface of the last an upper-forming cavity, said cavity extending downwardly to a level slightly below the bottom of the last, said sole plate having an upper surface corresponding in area to the bottom to be attached to the upper, means supporting the sole plate for movement relative to the ring from a position engaged with the lower surface of the ring in which a first injection may be effected to form the upper and an integral bottom layer, and a second position lowered from the bottom of the last in which a second injection is effected to form an outsole layer including a peripheral extension.

12. A mold assembly according to claim 11, comprising means on the sole plate engageable with the lower surface of the ring operable to limit the first injection to an area at the bottom corresponding in size to the bottom opening in the ring, and means engaged with the bottom of the ring containing an opening within which the sole plate is movable relative to the bottom, said latter opening corresponding in size to the entire area of the bottom including the bottom extension.

13. Apparatus according to claim 11, wherein the means on the sole plate comprises a yieldable gasket secured to the sole plate for engagement with the marginal area at the lower side of the ring which is situated between the last-named means and the edge of the opening at the bottom of the ring.

14. A mold assembly for injection molding of footwear, said assembly embodying a side ring extending from the tip of the toe rearwardly to the back line of the heel, said ring having an interior corresponding in size to the bottom to be formed and forming in conjunction with the bottom of the last a bottom-forming cavity and at the back part above the bottom of the last an interior surface spaced from the side wall of the last and forming in conjunction therewith a cavity rearwardly of the widest part of the last coextensive with the quarter portion of the shoe, and a forepart insert at the forepart above the bottom of the last, said insert containing an interior surface which is coextensive with the forepart of the last and extends from the tip rearwardly to the widest part of the last and from the top of the last to the bottom of the last, said sole plate corresponding in size to said bottom cavity and being movable therein relative to the bottom of the last.

References Cited

UNITED STATES PATENTS

| | | | |
|---|---|---|---|
| 1,111,436 | 9/1914 | Butterfield | 18—17 |
| 1,855,098 | 4/1932 | Collins | 18—17 |
| 2,553,999 | 5/1951 | Banovsky | 18—17 |
| 2,878,523 | 3/1959 | Hardy | 18—17 XR |
| 3,018,517 | 1/1962 | Ludwig | 18—17 |
| 3,044,122 | 7/1962 | Webb et al. | 18—17 XR |
| 3,102,286 | 9/1963 | Minick | 18—17 XR |
| 3,171,161 | 3/1965 | Hardy | 18—17 |
| 3,173,173 | 3/1965 | Lister | 18—17 |
| 3,267,520 | 8/1966 | Ludwig | 18—17 |
| 3,314,640 | 4/1967 | Snow | 18—34 |

FOREIGN PATENTS

| | | |
|---|---|---|
| 563,964 | 1/1957 | Italy. |

J. HOWARD FLINT, JR., *Primary Examiner.*